United States Patent
DeMonte

(10) Patent No.: US 7,233,737 B2
(45) Date of Patent: Jun. 19, 2007

(54) FIXED-FOCUS CAMERA MODULE AND ASSOCIATED METHOD OF ASSEMBLY

(75) Inventor: Frank J. DeMonte, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 24 days.

(21) Appl. No.: 10/639,799

(22) Filed: Aug. 12, 2003

(65) Prior Publication Data
US 2005/0036778 A1 Feb. 17, 2005

(51) Int. Cl.
*G03B 17/12* (2006.01)
*G02B 7/02* (2006.01)

(52) U.S. Cl. .................. 396/89; 396/529; 348/340; 348/345; 348/375; 359/819

(58) Field of Classification Search ............. 348/335, 348/340, 345, 374, 375; 359/819, 823, 826; 396/89, 529
See application file for complete search history.

(56) References Cited

U.S. PATENT DOCUMENTS

| | | | |
|---|---|---|---|
| 5,793,540 A | | 8/1998 | Obtsuki et al. |
| 5,831,777 A | * | 11/1998 | Iwasa .................... 359/826 |
| 6,741,405 B1 | * | 5/2004 | Chen ...................... 359/813 |
| 2001/0055073 A1 | * | 12/2001 | Shinomiya .............. 348/374 |
| 2003/0048378 A1 | * | 3/2003 | Kim et al. ............... 348/375 |
| 2003/0137595 A1 | * | 7/2003 | Takachi .................. 348/340 |
| 2004/0095499 A1 | * | 5/2004 | Ning ...................... 348/355 |
| 2004/0109080 A1 | * | 6/2004 | Chan et al. ............. 348/345 |

OTHER PUBLICATIONS

Amkor Technology Data Sheet for Image Sensor entitled "VisionPak® Camera Module"; 2 pgs.; © 2002.
Agilent Product Overview entitled "Agilent ADCM-2650 Portrait VGA Resolution CMOS Camera Module"; 2 pages; © May 13, 2003.
Agilent Data Sheet entitled "Agilent ADCM-1650-3011 CIF Resolution CMOS Camera Module"; 16 pgs; © May 13, 2003.
Agilent Technologies homepage: "www.agilent.com".

* cited by examiner

*Primary Examiner*—W. B. Perkey
(74) *Attorney, Agent, or Firm*—RatnerPrestia

(57) ABSTRACT

A fixed-focus camera module includes an image sensor, a lens for focusing an image onto the image sensor, and a positioning structure for maintaining an alignment of the lens and image sensor. The alignment provides a desired image quality of the image focussed onto the image sensor. The positioning structure includes a first unthreaded member coupled to the lens and a second unthreaded member coupled to the image sensor. One of the first and the second members is configured to be inserted into the other of the members to provide an adjustable relative position of the lens and the image sensor.

11 Claims, 9 Drawing Sheets

FIXED-FOCUS CAMERA MODULE AND ASSOCIATED METHOD OF ASSEMBLY

THE FIELD OF THE INVENTION

The present invention relates generally to camera modules, and more particularly to a fixed-focus camera module having a positioning structure for maintaining an alignment of the lens and image sensor.

BACKGROUND OF THE INVENTION

Digital camera technology is being used in an increasing variety of mass-produced applications, and in increasing production volumes. For example, miniature fixed-focus digital camera modules are being incorporated into consumer products such as portable telephones and personal digital assistants (PDA's). Given the new high volume applications for digital camera modules, it is desirable to reduce their per unit material and assembly costs.

Digital camera modules generally include a lens for focusing incoming light onto an image sensor that detects an image and converts it into an electrical signal representation. An image processor is employed to further manipulate the image signal into an image of a suitable quality for output. Digital camera modules also typically include a chassis and enclosure for mounting the various electronic and optical components and for protecting the components from particulate and spurious light contamination.

Modern digital camera modules are expected to provide high-quality imaging at low cost. Notwithstanding signal processing techniques, image quality fundamentally depends on the camera's optics. In fixed-focus camera modules, the focus is often set as part of the assembly process. Conventional assembly processes for digital camera modules tend to be labor-intensive. In particular, the focusing is often a manual operation in which an operator sets and secures the focus of each individual unit. Typically, setting the focus requires high-precision positioning of the camera's lens relative to the image sensor.

Because traditional focusing processes are manual operations, and because human operators cannot reliably achieve a sufficient focus without mechanical assistance, conventional camera modules typically include high-precision structural features that facilitate setting the proper focus, such as a lens assembly that attaches to the camera housing with screw threads. The threaded attachment provides a mechanism for positioning the focal point on the image sensor, and maintains planarity between the lens and image sensor. During assembly of a conventional digital camera module, an operator typically threads the lens assembly onto the camera housing until a proper focus is achieved. Next, the operator fixes the threaded lens assembly positioning with a drop of adhesive, for example. Therefore, the screw threads on the lens assembly and camera housing provide a mechanism for achieving a high accuracy/high precision positioning of the lens and image sensor without the use of high precision assembly instruments.

As mass-produced products, digital camera modules are preferably constructed from low-cost materials whenever possible. The use of built-in structural features, such as screw threads, for establishing a proper focus for each manufactured digital camera module, limits the ability to use low cost construction materials. Only certain types of materials can support machining and/or high precision molding, and such materials are typically more expensive than the materials that are unable to support such processes. Also, it is desirable to minimize per unit costs associated with the assembly process. Creating high-precision features typically requires machining the parts and/or molding the parts with high precision. For parts having machined features, the process of machining adds costs to the parts. Moreover, particulate residue from the machining process can remain on the parts and can potentially settle on the image sensor, thereby partially obstructing it. For parts molded with high precision, materials of relatively high cost are typically required, as compared to materials for low-precision molded parts.

An alternative solution to high-precision lens/image sensor placement is the use of lens materials that permit high-tolerance placement of the lens and image sensor. However, such materials are costly compared to conventional lens materials.

SUMMARY OF THE INVENTION

One embodiment of the present invention provides a fixed-focus camera module including an image sensor, a lens for focusing an image onto the image sensor, and a positioning structure for maintaining an alignment of the lens and image sensor. The alignment provides a desired image quality of the image focussed onto the image sensor. The positioning structure includes a first unthreaded member coupled to the lens and a second unthreaded member coupled to the image sensor. One of the first and the second members is configured to be inserted into the other of the members to provide an adjustable relative position of the lens and the image sensor.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
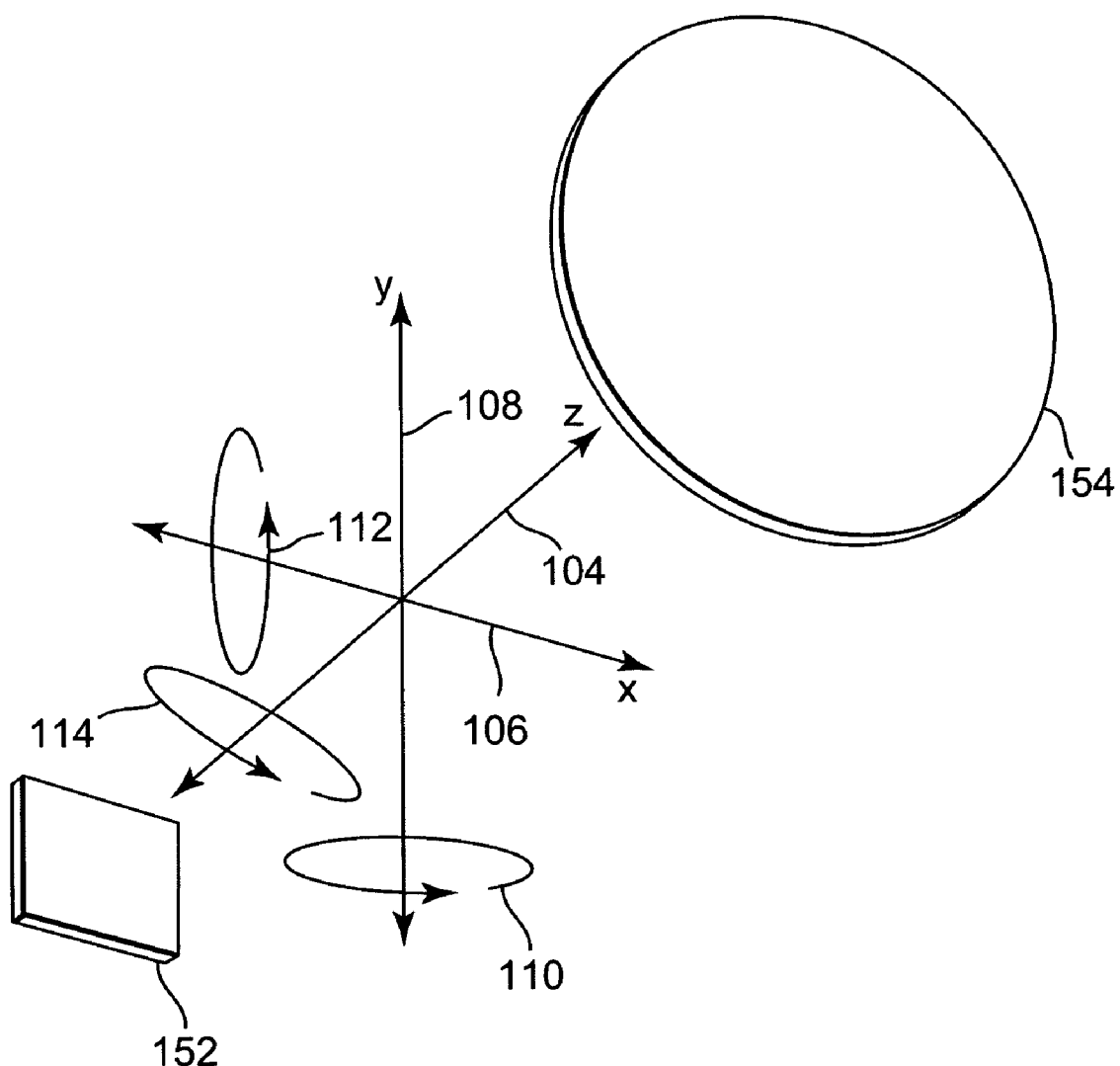
FIG. 1 is a diagram illustrating the six possible degrees of freedom associated with aligning a lens and an image sensor.

Part of the assembly process of fixed-focus digital camera modules involves achieving a proper focus of the image projected onto the image sensor. Focusing is typically accomplished by positioning the lens relative to the image sensor. FIG. 1 is a diagram illustrating various ways of positioning an image sensor 152 and a lens 154. Typically, the positioning is along five degrees of freedom: translationally along an axis 104 perpendicular to the plane of the image sensor 152 (for adjusting the focal distance), translationally along each of two orthogonal axes 106 and 108 parallel to the plane of the image sensor 152 (for placing the point of convergence over the image sensor 152), and rotationally about the two orthogonal axes 106 and 108 parallel to the plane of the image sensor 152, as indicated respectively at 112 and 110, to achieve coplanarity of the lens 154 and image sensor 152 (for optimizing the uniformity of focus over the image). Some applications may require a sixth degree of freedom 114, which provides for rotational adjustment about the axis 104 perpendicular to the plane of the image sensor 152.

Figure 2:
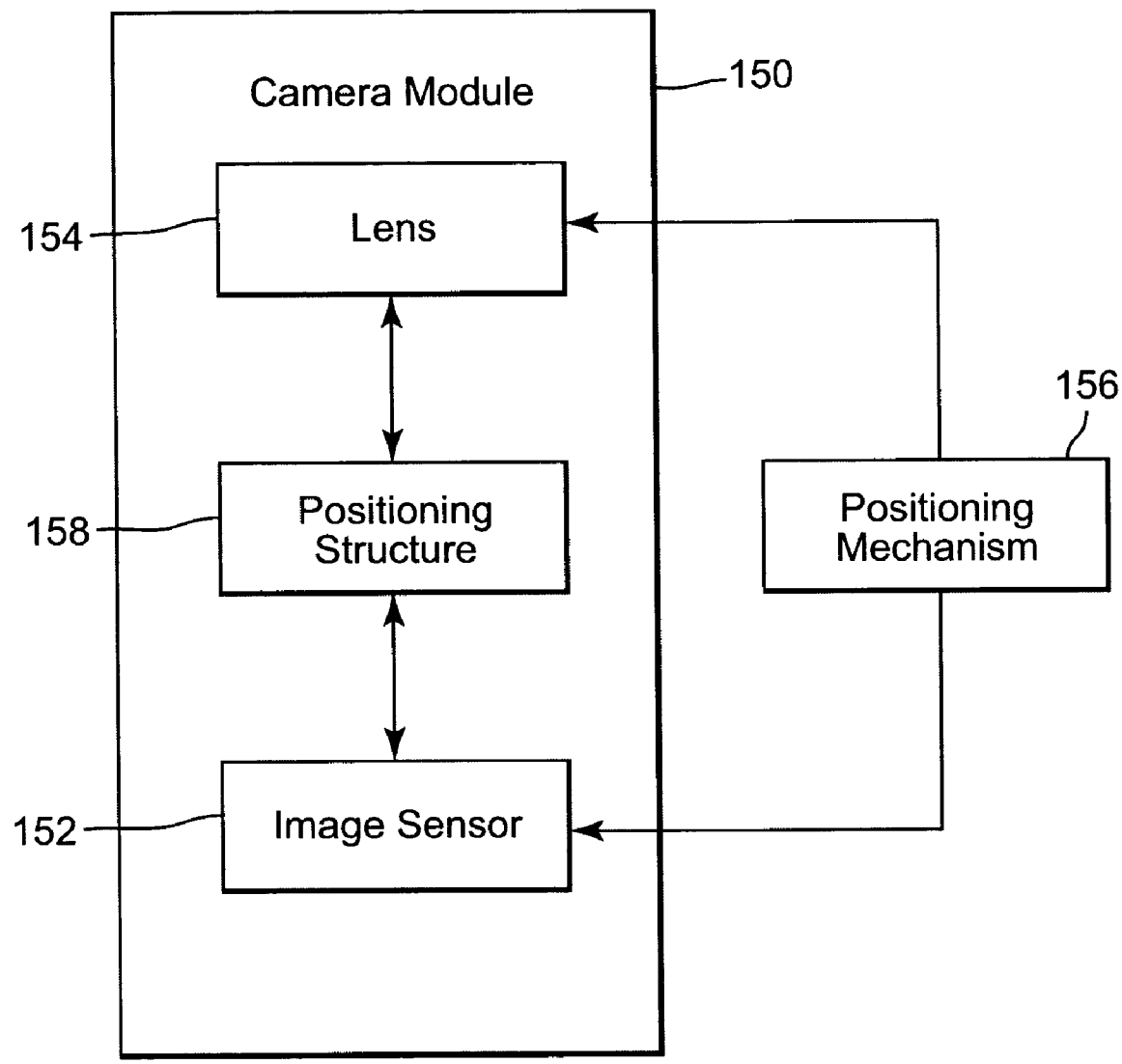
FIG. 2 is a block diagram illustrating one embodiment of a camera module according to the present invention.

One aspect of the present invention is directed to a digital camera module that maintains a high-accuracy lens/image sensor alignment without using high-precision lens alignment features such as machined threads. FIG. 2 is a block diagram illustrating one embodiment of a camera module 150, including an image sensor 152, a lens 154, and a positioning structure 158. In this embodiment, positioning mechanism 156, which is external to camera module 150, positions image sensor 152 and lens 154 relative to each other with sufficient precision to establish a desired image quality of an image focussed onto the image sensor 152 by lens 154. After image sensor 152 and lens 154 are properly positioned, the image sensor 152 and lens 154 are secured to a positioning structure 158 that is part of camera module 150.

In one embodiment, positioning structure 158 includes one or more components that make up a structure for maintaining a relative placement of image sensor 152 and lens 154. In one form of the invention, positioning structure 158 has mechanical properties sufficient to maintain the secured positioning of image sensor 152 and lens 154 within a tolerance suitable for maintaining the desired image quality, but does not have attributes of an aggregate mechanical tolerance for establishing a positioning of the lens 154 and image sensor 152 to achieve a desired accuracy of focus. Aggregate mechanical tolerance refers to the tolerances of all of the individual components involved in maintaining the positioning of the lens 154 and image sensor 152, considered collectively. For example, a common way of determining the aggregate mechanical tolerance is by computing the root-sum squared (RSS) of the individual tolerances. By contrast, in a conventional camera module employing high precision attributes such as machined screw threads, the high precision attributes are provisions intrinsic to the conventional camera module that provide necessary assistance to an imprecise positioning process to achieve the high-accuracy positioning.

In one embodiment, camera module 150 has high-accuracy lens/image sensor positioning notwithstanding camera module 150's exclusion of the high-precision positioning attributes because the positioning is established in significant part by extrinsic positioning mechanism 156 (i.e., without significant reliance upon positioning structure 158 for attaining the positioning). Once the high-accuracy positioning is established, camera module 150 maintains the high-accuracy positioning by employing positioning structure 158 that is capable of resisting structural deformation of a degree that would cause the relative positioning of the image sensor 152 and lens 154 to exceed the positioning tolerance.

In one embodiment, the use of positioning mechanism 156 permits positioning structure 158 to exclude one or more high-precision alignment attributes (such as screw threads for lens positioning) that would otherwise be needed to achieve a proper lens/image sensor alignment in the absence of extrinsic positioning mechanism 156. In another embodiment, positioning structure 158 includes some alignment attributes for achieving only a portion of the full alignment for the desired image quality. In another embodiment, positioning structure 158 excludes alignment attributes for achieving alignment in at least one degree of freedom.

For example, in one embodiment, positioning mechanism 156 accomplishes a proper positioning with respect to five degrees of freedom 104, 106, 108, 110, and 112, as illustrated in FIG. 1. In another embodiment, positioning mechanism 156 position the lens 154 and image sensor 152 with respect to a sixth degree of freedom 114. In another embodiment, positioning mechanism 156 position lens 154 and image sensor 152 along only one degree of freedom, such as along axis 104.

Figure 3A:
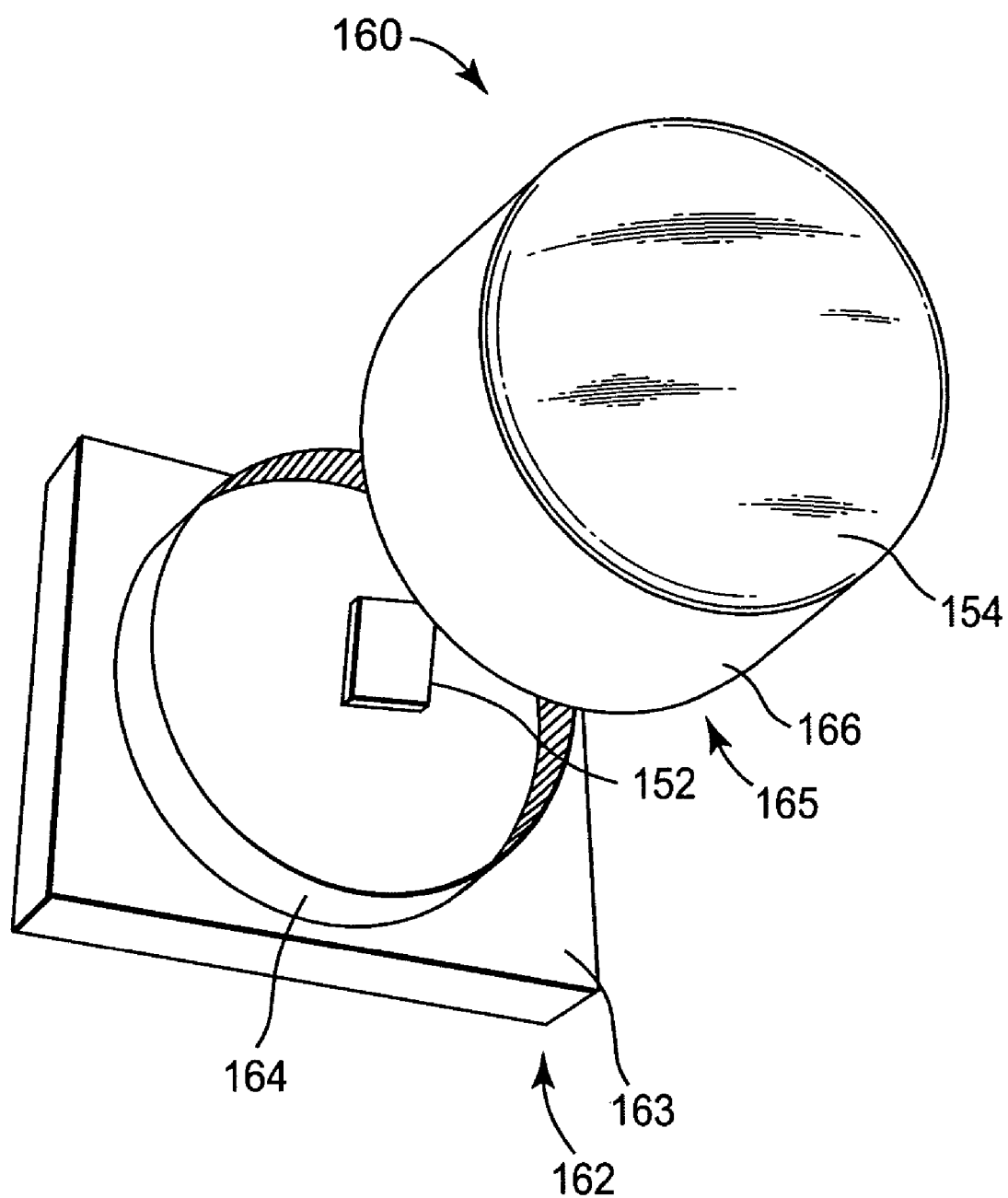
FIG. 3A is an exploded view diagram illustrating a camera module that includes a housing that also functions as a positioning structure according to one embodiment of the present invention.

In one embodiment, the camera module's housing functions as the positioning structure 158. FIG. 3A illustrates an exploded view diagram of one such embodiment. Disassembled camera module 160 includes a base 162 and a lens assembly 165. Base 162 includes a base portion 163 for mounting an image sensor 152, and a first cylindrical housing portion 163 surrounding the image sensor 152. Camera module 160 also includes a lens assembly 165, which includes a lens 154 and a second cylindrical housing portion 166. In one embodiment, lens assembly 165 and base 162 are adapted to fit together in a slip-fit manner when the camera module 160 is assembled and the image sensor 152 and lens 154 are approximately aligned.

Figure 3B:
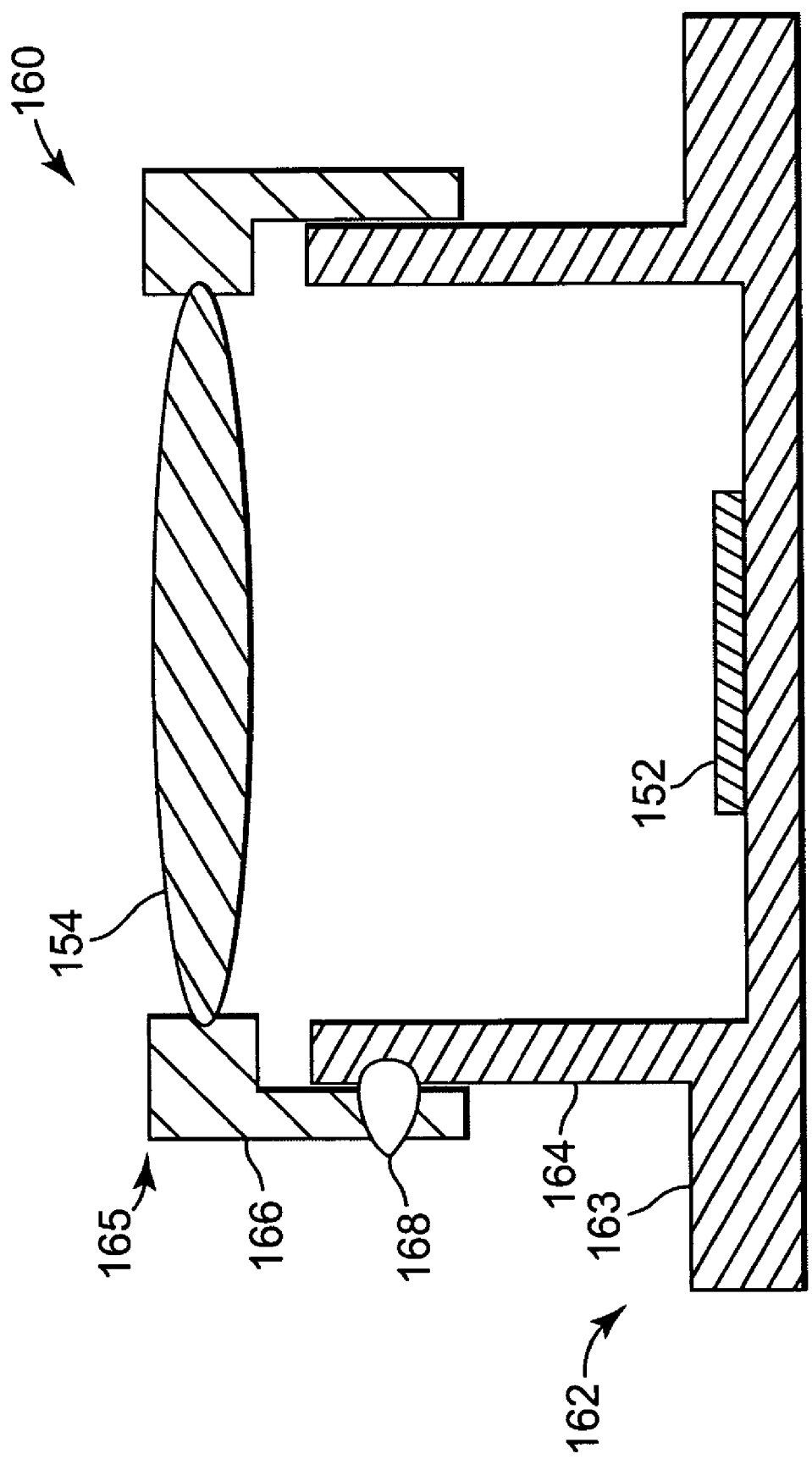
FIG. 3B is a cross-sectional view diagram illustrating the camera module of FIG. 3A according to one embodiment of the present invention.

FIG. 3B illustrates a cross-sectional view of the camera module 160 shown in FIG. 3A after assembly. Lens assembly 165 is positioned over base 162 in one embodiment by positioning mechanism 156, and the positioning is fixed with attachment material 168. In one form of the slip-fit engagement of the lens assembly 165 and base 162 provides a temporary fix of the positioning, which is made permanent by the attachment material 168. In one embodiment, attachment material 168 is a bonding compound such as an adhesive. In another embodiment, attachment material 168 is formed by at least one welded joint employing materials of the camera module itself. In one form of the invention, attachment material 168 is applied at three equidistant points along the perimeter of the base 162/lens assembly 165 interface.

Figure 4A:
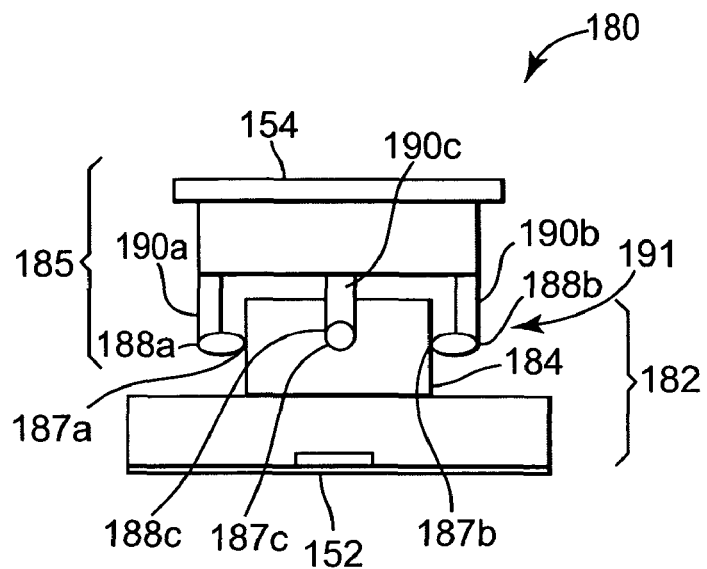
FIG. 4A is a side-view diagram illustrating a camera module having a positioning structure that includes attributes for achieving alignment of the lens and image sensor according to one embodiment of the present invention.
Figure 4B:
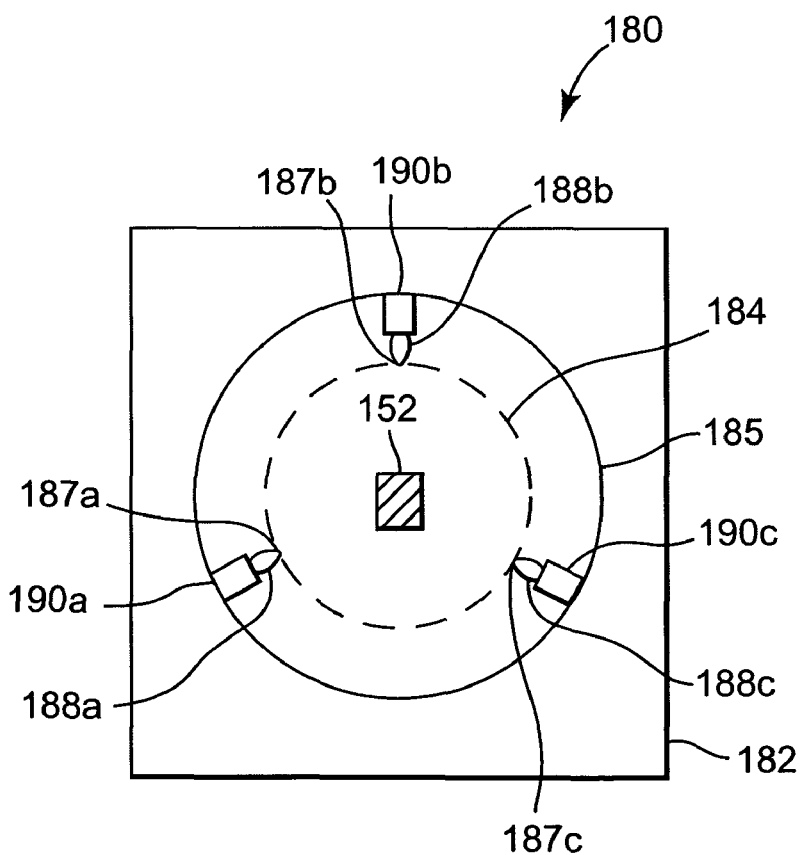
FIG. 4B is a top-view diagram illustrating the camera module of FIG. 4A according to one embodiment of the present invention.

In one embodiment, where the positioning by positioning mechanism 156 is with respect to fewer degrees of freedom than is needed for full alignment of image sensor 152 and lens 154, the complete positioning is accomplished in part by alignment attributes of the positioning structure. FIGS. 4A and 4B are side view and top view diagrams, respectfully, illustrating an exemplary digital camera module 180 having a positioning structure that includes attributes for facilitating alignment of the lens and image sensor. Camera module 180 includes a base 182 and a lens assembly 185. Base 182 contains image sensor 152 and includes a lens assembly interface surface 184. Lens assembly 185 includes lens 154. When the focus of camera module 180 is being adjusted, base 182 and lens assembly 185 are coupled with an adjustable coupling 191, which includes points of contact 187a, 187b, and 187c (collectively referred to as points of contact 187).

Adjustable coupling 191 further includes three members 190a, 190b, and 190c (collectively referred to as members 190) that extend towards the base 182 perpendicularly to lens 154 as indicated in FIG. 4A. The three members 190a, 190b, and 190c are attached to centering contacts 188a, 188b, and 188c (collectively referred to as centering contact 188), respectively. Centering contacts 188 are slideably coupled to lens assembly interface surface 184 of base 182. Centering contacts 188 make contact with base 182 at the points of contact 187, which are spaced equidistantly along the perimeter of the lens assembly interface surface 184. Adjustable coupling 191 aligns lens 154 and image sensor 152 along two orthogonal axes, indicated at 106 and 108 in FIG. 1, that define a plane parallel to the image sensor 152. The accuracy of the alignment along axes 106 and 108 depends on a number of tolerances of the digital camera module 180, including the lens positioning relative to the centering contacts 188, the elasticity of members 190, and the positioning of image sensor 152 relative to lens assembly interface surface 184. Therefore, this embodiment is useful in applications where alignment along axes 106 and 108 does not require especially high precision, such as where the projected image is larger than the image sensor.

The adjustable aspect of the adjustable coupling 191 provides adjustment along the axis perpendicular to the image sensor indicated at 104 in FIG. 1, as well as with respect to degrees of freedom 110, 112, and 114 (rotationally about the three axes). After the lens 154 and image sensor 152 are fully aligned, the adjustable coupling 191 is made permanent by securing the points of contact 187 at the interface of lens assembly interface surface 184 and surfaces of centering contacts 188. Thereafter, the focus is maintained within a tolerance determined by the deformability of the positioning structure coupling lens 154 and image sensor 152, including the deformability of members 190.

In one embodiment, centering contacts 188 are details that facilitate securing of the lens assembly 185 to base 182. For example, in one embodiment, centering contacts 188 provide surfaces for adhesively bonding lens assembly 185 to lens assembly interface surface 184. In another embodiment, centering contacts 188 are adapted to be welded to base 182 by a hot probe welding process. In another embodiment, centering contacts 188 are adapted to function as energy directors for focusing the energy of an ultrasonic welding process used for welding centering contacts 188 to lens assembly interface surface 184 at the points of contact 187.

In another embodiment, centering contacts 188 do not directly facilitate the securing of the lens assembly 185 and base 182. In one such embodiment, centering contacts 188 function merely for maintaining alignment of the lens 154 and image sensor 152, such that the securing of the lens assembly 185 and base 182 is accomplished at other adjustably-coupled points of contact.

Another aspect of the present invention is directed to a method of assembling a digital camera module that permits the digital camera module to exclude costly high-precision lens alignment features, yet maintain a high-accuracy lens/image sensor alignment. Referring to FIG. 2, positioning mechanism 156 in one embodiment employs predetermined positioning to achieve high-precision repeatable alignment of lens 154 and image sensor 152.

Figure 5:
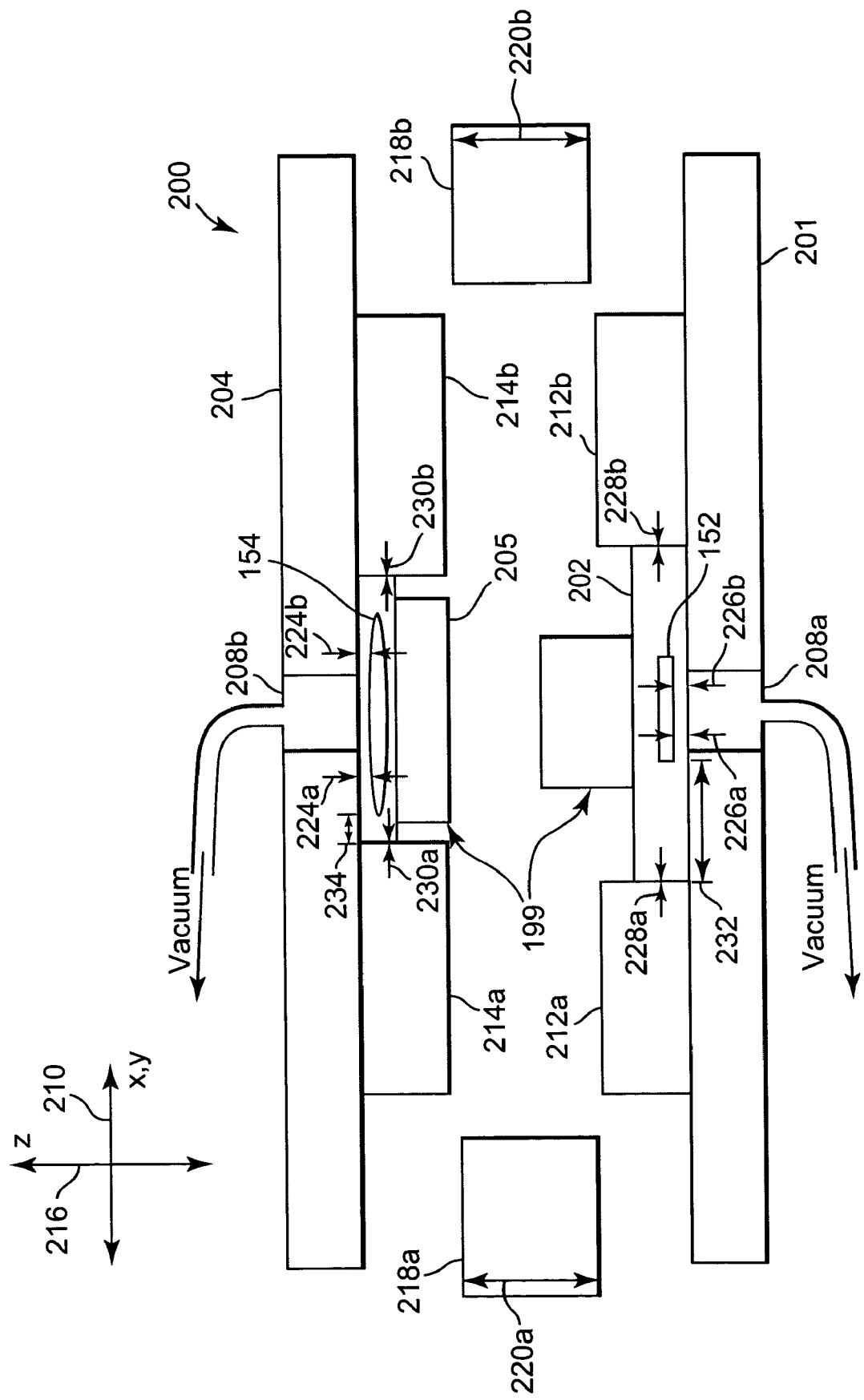
FIG. 5 is a diagram illustrating a method of assembling a digital camera module employing predetermined positioning of the lens and image sensor according to one embodiment of the present invention.

FIG. 5 is a diagram illustrating a method of assembling a digital camera module 199 employing predetermined positioning of the lens and image sensor. Camera module 199 includes base 202 and lens assembly 205. Assembly is accomplished in one embodiment with fixturing indicated generally at 200. Fixturing 200 includes a lower plate 201 for positioning digital camera module base 202 containing image sensor 152. Fixturing 200 also includes upper plate 204 for positioning lens assembly 205 containing lens 154. In one embodiment, operation of the fixturing 200 is completely automated so that the positioning portion of the assembly process of lens assembly 205 and base 202 requires only minimal human operator involvement.

In one embodiment, lower plate 201 and upper plate 204 each have a vacuum channel 208a and 208b, respectively, for holding base 202 and lens assembly 205, respectively, using atmospheric pressure. In another embodiment, base 202 and lens assembly 205 are held in place respectfully against plates 201 and 204 by friction fit against centering features 212a and 212b and 214a and 214b.

For positioning the base 202 and lens assembly 205 along x and y axes (that define a plane parallel to the image sensor) indicated at 210, fixturing 200 includes centering features 212a and 212b (collectively referred to as centering features 212) for lower plate 201, and centering features 214a and 214b (collectively referred to as centering features 214) for upper plate 204. In one embodiment, centering features 212 and/or 214 are centering pegs. In another embodiment, centering features 212 and/or 214 are centering blocks. In yet another embodiment, centering features 212 and/or 214 are walls. In one embodiment, centering features 212 and 214 are each a single feature, such as a cylindrical wall.

In another embodiment, centering features 212 and/or 214 are each a plurality of details. For example, in one embodiment, where fixturing 200 is adapted for assembling the camera module 160 illustrated in FIG. 3A, centering features 212 are a set of four centering pegs positioned to line up with the center of each wall of base 162 perpendicular to the image sensor 152; and centering features 214 are a set of three pegs positioned to line up along the walls of lens assembly 165 at three equidistant points. For diagrammatic purposes, two of each centering feature are shown as blocks in FIG. 5.

For positioning the base 202 and lens assembly 205 along z axis 216 perpendicular to the image sensor, fixturing 200 employs spacing features 218a and 218b (collectively referred to as spacing features 218). In one embodiment, spacing features 218 are datum spacers located between upper plate 204 and lower plate 201 that establish a spacing between the plates 201 and 204 in the z direction 216 according to the z-axis positioning/geometry 220a and 220b (collectively referred to as positioning/geometry 220) of the spacing features 218*a* and 218*b*, respectively. In another embodiment, spacing features 218 are replaced by a feedback control positioning system, discussed in greater detail below.

According to the embodiment of fixturing 200 illustrated in FIG. 5, the precision of positioning lens 154 relative to image sensor 152 depends on a number of tolerances, as will be recognized by one skilled in the art. For example, the degree of coplanarity of the lens 154 and image sensor 152 depends upon coplanarity of plates 201 and 204, which, in turn, depends upon the precision/tolerances of spacing features 218. Also, the degree of coplanarity of the lens 154 and image sensor 152 depends upon the degree of coplanarity in the positioning 224*a* and 224*b* (collectively referred to as positioning 224) of lens 154 within lens assembly 205, and upon the degree of coplanarity of the positioning 226*a* and 226*b* (collectively referred to as positioning 226) of image sensor 152 within base 202. Likewise, the precision of the positioning of lens 154 and image sensor 152 along the z axis 216 depends upon the precision of the positioning/geometry 220 of the spacing features 218, and upon the positioning 224 and positioning 226.

As for the precision of lens/image sensor alignment along the x and y axes 210, such precision depends upon the tolerance in any gaps 228*a* and 228*b* between centering features 212 and base 202, and upon the tolerance in any gaps 230*a* and 230*b* between centering features 214 and lens assembly 205. Alignment along the x and y axes 210 also depends upon the precision of positioning 232 in the x and y axes 210 of image sensor 152 within base 202, and upon the precision of positioning 234 of lens 154 within lens assembly 205. All tolerances mentioned above are within the allowable tolerances for each degree of freedom of lens/image sensor alignment associated with a desired image quality.

Figure 6A:
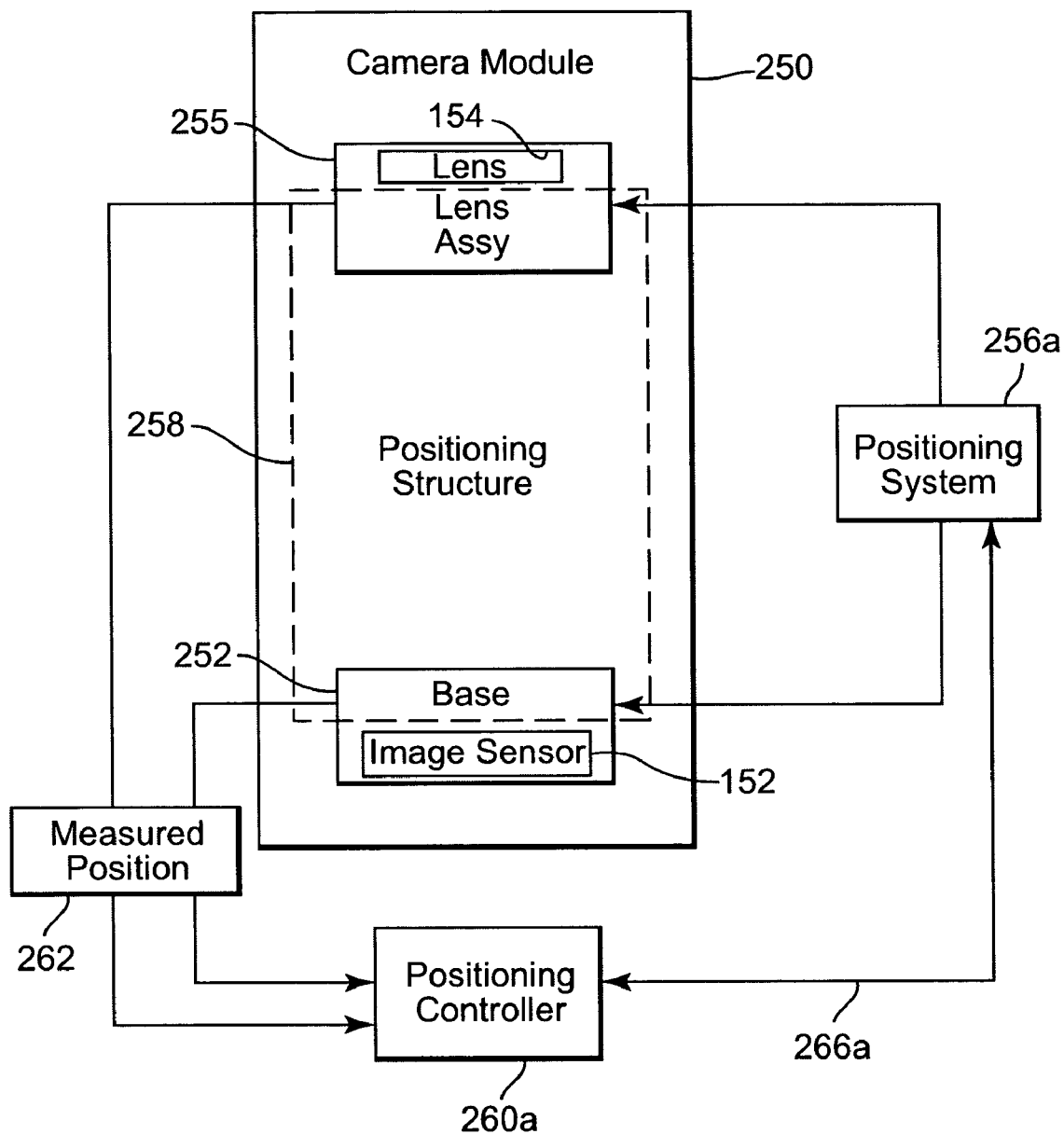
FIG. 6A is a diagram illustrating a method of aligning a lens and image sensor employing predetermined positioning thereof, and employing a feedback-control positioning system according to one embodiment of the present invention.

Another embodiment, employing predetermined positioning of the lens and image sensor, as well as a feedback-control positioning system is illustrated in FIG. 6A. A digital camera module 250 is assembled utilizing extrinsic positioning system 256*a* employing positioning controller 260*a*. Positioning controller 260*a* uses feedback control principles for positioning the lens 154 and image sensor 152 along at least one degree of freedom based on predetermined target positioning and measured actual positioning 262 of the lens 154 and image sensor 152. Lens 154 and image sensor 152 are each a part of lens assembly 255 and base 252, respectively. Portions of lens assembly 255 and base 252 make up a positioning structure indicated at 258. In one embodiment, the positioning system 256*a* is completely automated so that the positioning portion of the assembly process of digital camera module 250 requires only minimal human operator involvement.

In one embodiment, positioning system 256*a* includes fixturing similar to fixturing 200 (FIG. 5) discussed above. In this embodiment, the proper positioning of image sensor 152 and lens 154 is accomplished by positioning base 252 relative to lens assembly 255 with a predetermined spacing. The positioning of the lens 154 in lens assembly 255, and the positioning of image sensor 152 in base 252 should be within an allowable tolerance for the desired precision of focus for camera module 250. Positioning system 256*a* and positioning controller 260*a* together include mechanics and electronics for achieving a relative positioning of lens assembly 255 and base 252 within the appropriate tolerance. Positioning controller 260*a* receives a feedback signal 262 representing the current positioning of the lens assembly 255 and base 252. Based on feedback signal 262, positioning controller 260*a* communicates positioning instructions to positioning system 256*a* via positioning control interface 266*a* indicating the adjustment needed to achieve the predetermined positioning.

In one embodiment, positioning system 256*a* includes a precision controllable motor such as a servo or stepping motor, coupled to mechanics for converting rotational motion of the motor's rotor into linear motion for linearly positioning a moveable upper plate 204 (FIG. 5). The motor is driven by positioning controller 260*a*, which is a motor controller capable of moving the motor's rotor by a predetermined number of degrees corresponding to a predetermined positioning of the upper plate 204, which in turn corresponds to the desired positioning of lens 154 and image sensor 152. In one embodiment, feedback signal 262 represents the amount of the rotor's rotation from a datum of origin, as known or measured by the motor or motor drive system.

In another embodiment, feedback signal 262 represents a measured positioning of the lens assembly 255 and base 252, as measured by a sensing system such as an optical sensing system. In another embodiment, the sensing system measures the positioning of the fixturing members, such as plates 204 and 201 (FIG. 5), which are coupled to the lens assembly 255 and/or the base 252.

Figure 6B:
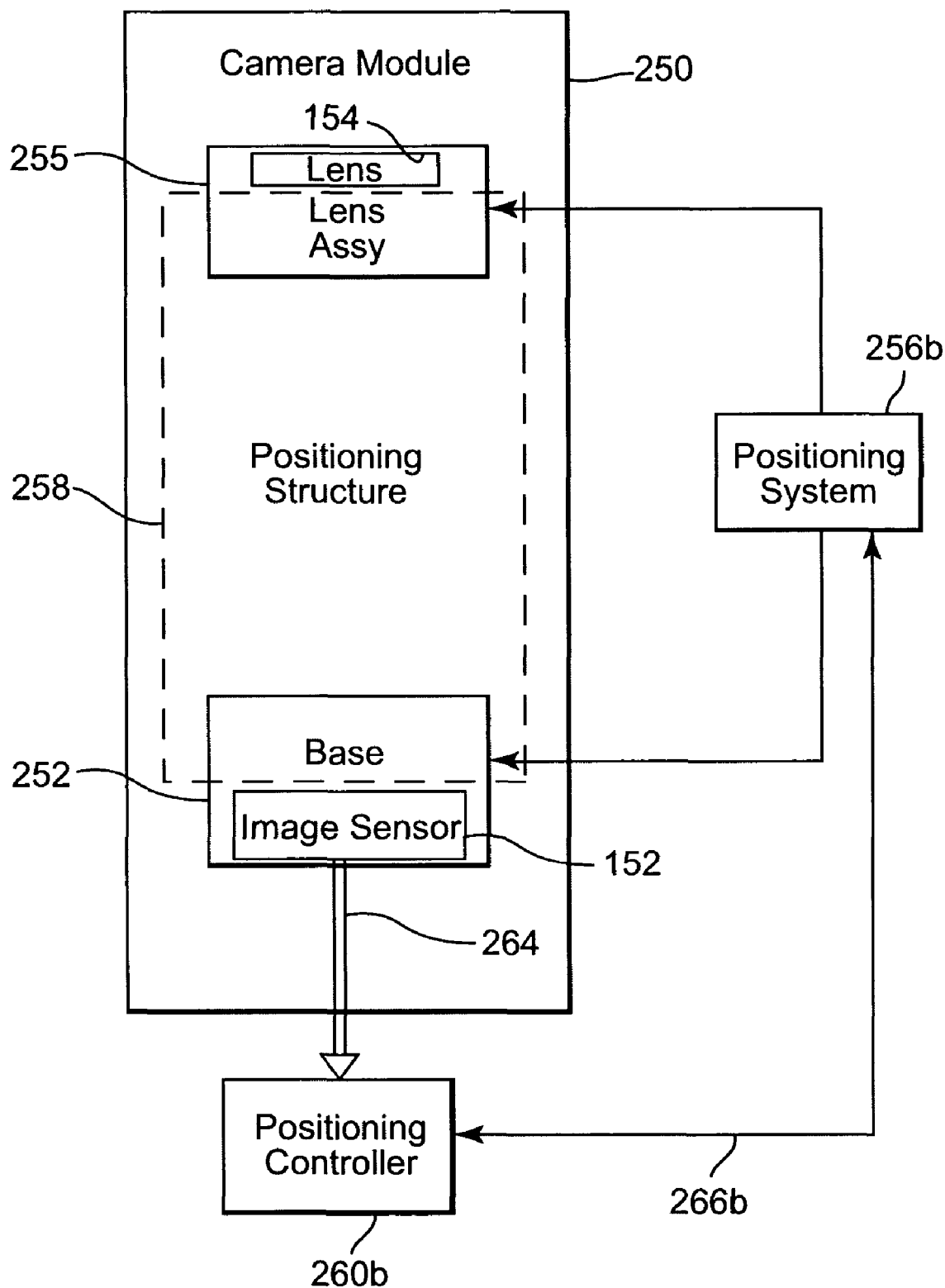
FIG. 6B is a diagram illustrating a method of aligning a lens and image sensor employing positioning based upon a desired image quality, and employing a feedback-control positioning system according to one embodiment of the present invention.

In another embodiment, as illustrated in FIG. 6B, the positioning of the lens 154 and image sensor 152 is not predetermined. Instead, the positioning relates to a desired image quality associated with a proper focus. In this embodiment, the feedback 264 to positioning controller 260*b* is an image output signal 264 from the image sensor 152. Based on image signal 264, positioning controller 260*b* instructs positioning system 256*b* via interface 266*b*. One advantage of this embodiment is that the positioning of lens 154 within lens assembly 255, and the positioning of image sensor 152 within base 252 do not require tight tolerances because variations in such positioning are corrected for with the feedback controlled positioning system.

In one such embodiment, a light spot is projected through lens 154 onto image sensor 152. Image sensor 152 provides image signal 264 to positioning controller 260*b*, which interprets the quality of the image represented by image signal 264. Based on the change in quality of the image corresponding to changing positioning of the image sensor 152 and lens 154, positioning controller 260*b* recognizes the direction of adjustment needed to improve the image quality. The relative positioning of lens assembly 255 and base 252 is adjusted by positioning system 256*b* according to instructions sent from positioning controller 260*b* to positioning system 256*b* until the light spot is of a minimum size, indicating that the lens 154 and image sensor 152 are in optimum focus.

In another embodiment, the camera module 250 is directed at a target image while its focus is adjusted, and positioning controller 260*b* is adapted to recognize the adjustment necessary to achieve proper focus of the target image at the image sensor 152.

Once the proper positioning is achieved by positioning system 256*a* or 256*b*, the lens assembly 255 and base 252 are secured to one another, thereby achieving a maintained lens/image sensor positioning in the absence of the positioning system 256*a* or 256*b*. In one embodiment, the securing is automated, so that the securing portion of the assembly process of digital camera module 250 requires only minimal human operator involvement. In another embodiment, the securing is automated, and is a part of an automated apparatus that also includes the positioning system 256*a* or 256*b*.

The securing is accomplished in one embodiment by adhesively joining contact points of a surface of lens assembly 255 to contact points of a surface of base 252. In another embodiment, the surfaces are joined by welding the material of the lens assembly 255 to the material of the base 252. In one embodiment, the welding process employs heat staking probes, and the contact surfaces of the lens assembly 255 and/or base 252 are adapted to facilitate such a hot probe welding process.

Figure 7:
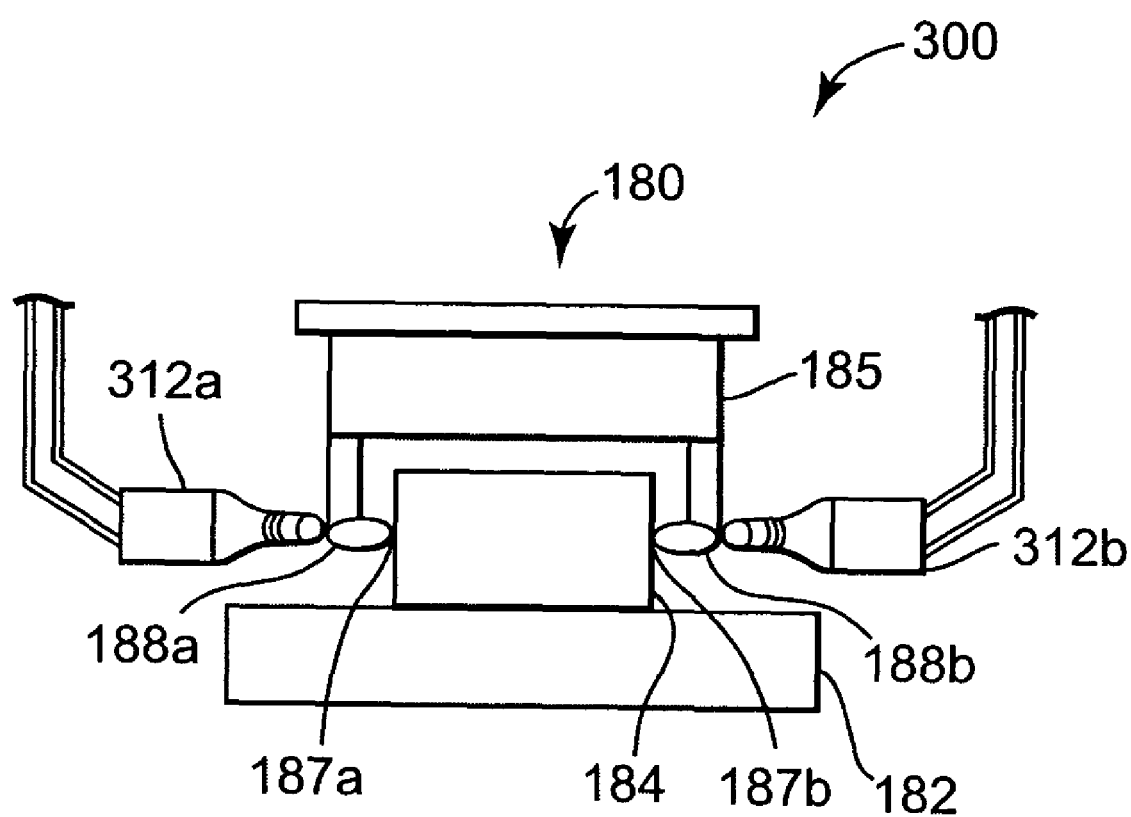
FIG. 7 is a diagram illustrating a process for securing a lens assembly to a camera module base employing ultrasonic welding according to one embodiment of the present invention.

In another embodiment, illustrated in FIG. 7, a welding process 300 employs ultrasonic welding probes 312*a* and 312*b* to bond the surfaces of centering contacts 188*a* and 188*b* of the lens assembly 185, and the interface surface 184 of the base 182 at points of contact 187*a* and 187*b*, all of which are adapted to facilitate such a welding process. In one example embodiment, centering contacts 188*a* and 188*b* are in the form of sonic horns for directing the ultrasonic energy to the points of contact 187*a* and 187*b*.

One aspect of the present invention provides a fixed focus digital camera module that can be fabricated using low-cost, low-precision materials and low-cost methods of assembly, while maintaining an adequate image focus for a desirable image quality. One form of the present invention accomplishes this aspect by employing an extrinsic positioning mechanism for establishing the digital camera's focus by properly aligning the camera's lens and image sensor relative to each other. A digital camera according to one embodiment does not use costly alignment attributes, and the alignment process is automated in one form of the invention. Effectively, the cost of focusing each manufactured digital camera module according to one embodiment is thereby transferred away from a variable per unit cost to a fixed non-recurring cost associated with the assembly process and equipment.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A fixed-focus camera module, comprising:
   an image sensor;
   a lens for focusing an image onto the image sensor; and
   an unthreaded, uncammed positioning structure for maintaining an alignment of the lens and image sensor to provide a desired image quality, the positioning structure including at least three first members extending perpendicularly to the lens and coupled to the lens and a second member coupled to the image sensor, the second member configured to be inserted into the first members to provide an adjustable relative position of the lens and the image sensor.

2. The fixed-focus camera module of claim 1, wherein the positioning structure includes at least one alignment attribute for facilitating a part of the alignment of the lens and image sensor.

3. The fixed-focus camera module of claim 1, wherein the first members and the second member are adapted to adjustably couple with one another.

4. The fixed-focus camera module of claim 3, wherein the first members and the second member each include a surface, and wherein the surface of each first member is securable to the surface of the second member in at least one contact point when the alignment for the desired image quality is achieved.

5. The fixed-focus camera module of claim 3, wherein the adjustable coupling of the first members and the second member is a slip-fit between the first members and the second member.

6. The fixed-focus camera module of claim 3, wherein an adjustment of the adjustable coupling in at least one degree of freedom facilitates establishing an alignment corresponding to the desired image quality.

7. The fixed-focus camera module of claim 3, wherein the adjustable coupling of the first members and the second member is adapted to establish an alignment corresponding to the desired image quality in at least one degree of freedom.

8. The fixed-focus camera module of claim 4, wherein at least one surface of the surfaces of the first members and the second member includes a detail adapted to facilitate a process for securing the adjustable coupling.

9. The fixed-focus camera module of claim 1, wherein the positioning structure's maintaining of the alignment is accomplished at least in part by at least one welded joint.

10. The fixed-focus camera module of claim 1, wherein the positioning structure's maintaining of the alignment is accomplished at least in part by at least one adhesively-bonded joint.

11. The fixed-focus camera module of claim 1, wherein the positioning structure comprises at least a portion of an enclosure of the camera module.

\* \* \* \* \*